United States Patent [19]
Kim

[11] 3,867,079
[45] Feb. 18, 1975

[54] APPARATUS FOR EXTRUDING POLYMERIC MATERIAL
[75] Inventor: Heung T. Kim, Avon Lake, Ohio
[73] Assignee: The B. F. Goodrich Company, New York, N.Y.
[22] Filed: Aug. 10, 1972
[21] Appl. No.: 279,697

[52] U.S. Cl. ............... 425/208, 425/378, 259/191
[51] Int. Cl. .............................................. B29f 3/02
[58] Field of Search ........ 425/208, 378, 379; 259/9, 259/10, 191

[56] References Cited
UNITED STATES PATENTS

| | | | |
|---|---|---|---|
| 2,343,529 | 3/1944 | Brown | 425/376 |
| 2,746,089 | 5/1956 | Hendry | 425/379 X |
| 3,271,819 | 9/1966 | Lacher | 259/191 |
| 3,650,652 | 3/1972 | Dray et al. | 425/208 |
| 3,698,541 | 10/1972 | Barr | 425/208 X |

Primary Examiner—R. Spencer Annear
Attorney, Agent, or Firm—Joseph Januszkiewicz

[57] ABSTRACT

An extruder apparatus for working polymeric material having a feed screw with dual flight defining a primary channel and a secondary channel. The primary channel progressively decreases in cross-sectional area while maintaining a constant width in cooperation with the secondary channel that increases in cross-sectional area to accommodate all the melt as it changes from a solid phase to a fluent phase. The secondary flight's height is such as to accommodate the melt as it is formed in the primary channel.

6 Claims, 4 Drawing Figures

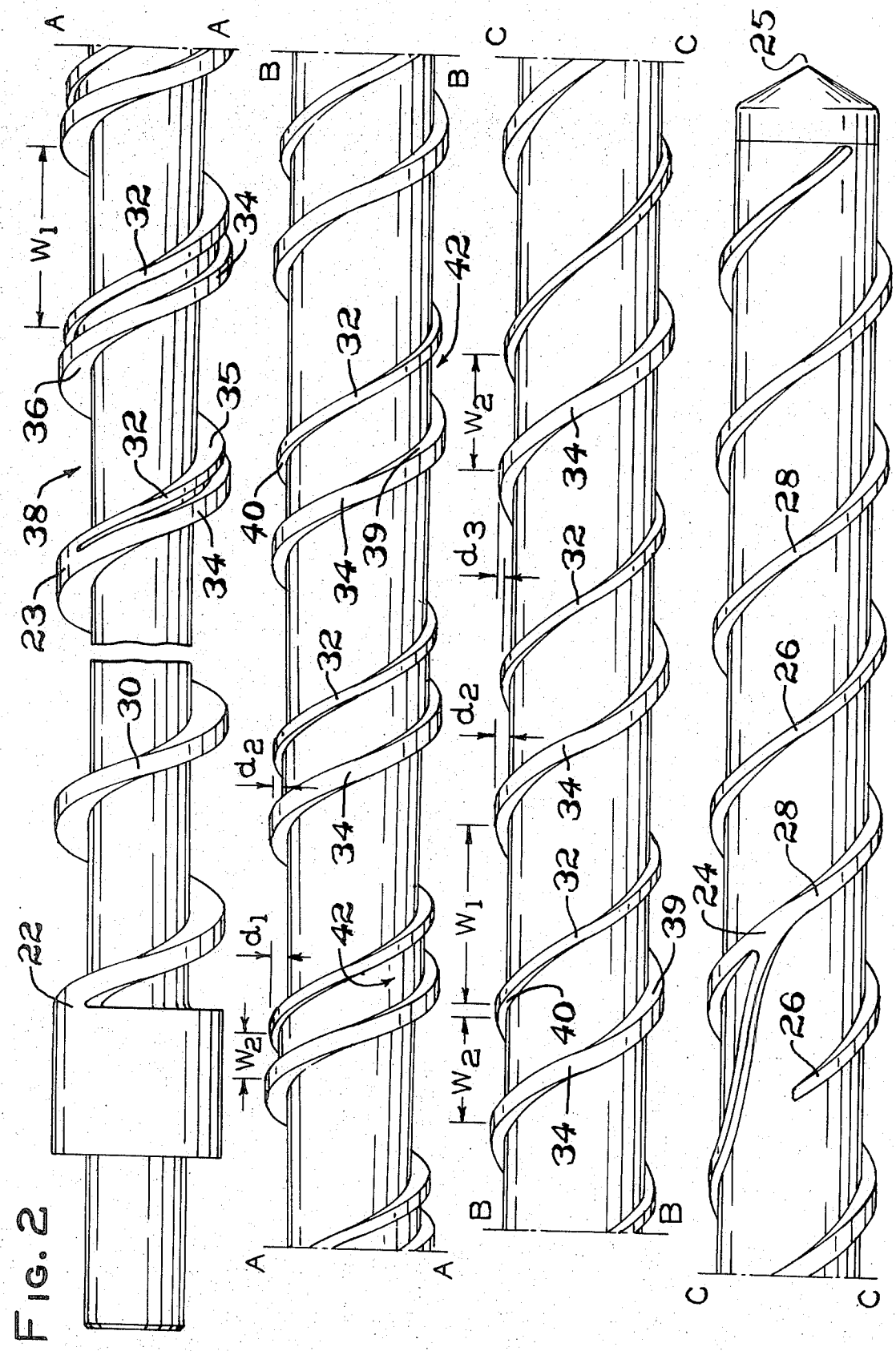

APPARATUS FOR EXTRUDING POLYMERIC MATERIAL

BACKGROUND OF THE INVENTION

The present invention relates to an extruder and more particularly to the feed screw of an extruder.

In the manufacture of plastic materials, the extruder receives the plastic material in its hopper and delivers such material to the feed screw for processing. The feed screw has a feed section for advancing the material at a predetermined rate, a transition section for plasticizing or working the material to turn it from a solid to a melted product, and a metering section or torpedo section for advancing the melt to the discharge end of the extruder. The present invention is directed to the improvement of the transition section which provides for a facile means for working the solid plastic materials being processed and converts such solid plastic material with maximum efficiency into a flowable mass that is fully plasticized and one that is homogeneous in nature. Heretofore it has been thought most desirable to work plastic material by working such plastic material at the feed section and transitional section with an exposure of a given mass to the rotational force of a helical feed groove which progressively diminishes in cross-sectional area without regard for its exposure to contact with the working area between the groove and the barrel. The present invention recognizes the desirability of exposing as much unplasticized solid material as possible to a working contact between the feed groove and the working area of the extruder barrel. It is not sufficient to merely reduce the cross-sectional area of the solid mass and increase the cross-sectional area of the melt groove but rather to provide for an effective maximum exposure of the solid mass to the shearing forces of the extruder. This is accomplished by providing a pair of grooves wherein a primary groove is used to convey the solid plastic material along with a secondary groove that moves the melt along. The primary groove's depth is decreased; however, the amount of material exposed to the working or melting action of the extruder barrel surface is held at a constant with maximum exposure thereto while the secondary channel which receives the melt increases in volume to assure that all the melt is retained separate from the solid unmelted plastic material.

SUMMARY OF THE INVENTION

The present invention contemplates the use of a rotary feed screw that has a portion thereof with a pair of helical flights defining a primary groove and secondary groove. The primary groove retains a constant width, however, its depth decreases to facilitate the diminishing volume of solid material while retaining maximum exposure to the interaction of such material to the barrel and wherein the secondary groove increases in volume progressively to accept the full melt as it is fed thereto from the primary groove.

BRIEF DESCRIPTION OF THE DRAWINGS

FIG. 2 with sections A—A, B—B, C—C, when longitudinally aligned is a side elevational view of the feed screw;

DETAILED DESCRIPTION

Figure 1:
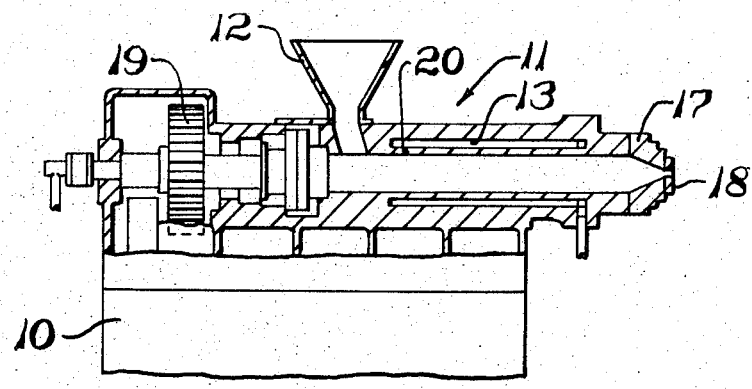
FIG. 1 is a side elevational view with a portion in cross section of an extruder without the feed screw.
Figure 3:
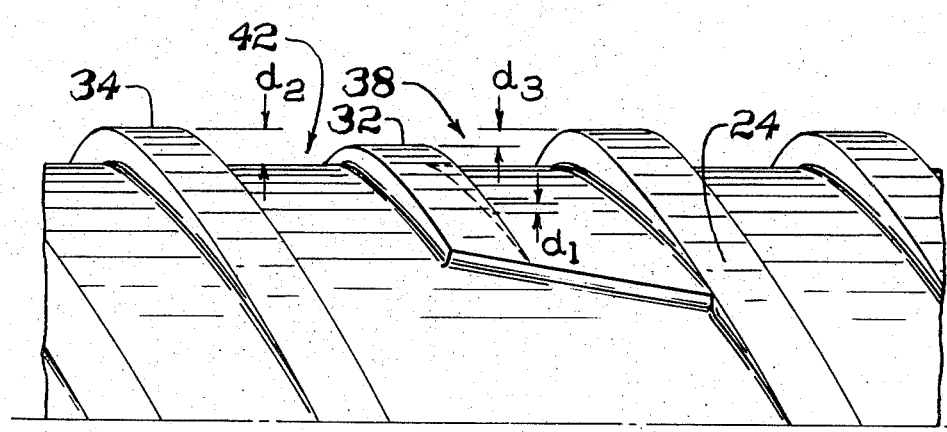
FIG. 3 is an enlarged fragmentary view of that portion of the feed screw showing the primary groove merging with the secondary groove.

Referring to the drawings, wherein like reference characters designate like or corresponding parts throughout the several views, there is shown in FIG. 1 a base 10 of an extruder designated generally by reference numeral 11. Extruder 11 has a hopper 12, a cooling means 13 for circulating water or similar cooling medium, an extruder head 17, a die 18, transmission means 19 driven by suitable means and a cylinder 20 in which a feed screw journaled for rotation shown in FIG. 2.

The feed screw is divided into three sections, a feed section from point 22 to point 23, a transition section from point 23 to point 24, and a metering section from point 24 to point 25, the front end of the feed screw. The metering section comprises dual flights 26 and 28, while the feed section includes a single helical flight 30; however, the metering section may be a single flight also.

The transition section has a continuation of the single flight 30 of the feed section, however, such flight at point 23 separates into two flights, a primary flight 32 and a secondary flight 34. The leading face 35 of primary flight 32 cooperates with the trailing face 36 of the secondary flight 34 to define a first means or a primary helical groove or channel 38. The leading face 39 of secondary flight 34 cooperates with the trailing face 40 of primary flight 32 to define a second means or secondary helical groove or channel 42. The width $w_1$ of primary groove 38, is the same dimension from point 23 to a closely adjacent point 24 while the depth $d$, of groove 38, progressively diminishes from point 23 to point 24. The depth $d$ is measured from the upper edge to the bottom portion of the groove. The width $w_2$ of the secondary groove increases progressively from point 23 to point 24 while its depth $d_2$ similarly increases such that the volume of secondary groove 42 from point 23 to point 24 is such that it progressively increases. The difference in dimension between the primary flight and the secondary flight is $d_3$ such as to assure the flow of melt from the primary channel 38 into the secondary channel 42. The primary channel 38 merges with the secondary channel 42 at point 24 wherein the clearance space between the working surface of channel 38 at this point and the barrel is equal to the clearance space between the top of the flight of the primary flight and the wall of the barrel.

As the feed screw is rotated, the feed section of the screw from points 22 through point 23 picks up the unrefined material which is deposited into the hopper 12 and delivers the unrefined material in a compacted form preworked condition to the transition section. The leading face 35 of the primary flight 32 exerts a continuous pressure on the moving worked material such that that portion of the solid phase material which comes in contact with the walls of the cylinder 20 changes into a fluent phase and is directed away from the remaining portion of the solid phase into the secondary groove 42. The clearance space between the upper portion of primary flight 32 and the barrel is greater than the clearance space between the upper portion of flight 34 and the barrel thereby accommodating the flow of the fluent phase material into the secondary groove 42. Since the primary groove diminishes progressively in volume it pushes the remaining solid phase material upwardly towards the cylinder wall. The cross-sectional $w_1$ remains constant to expose as much of the solid phase material as possible to the effect of the heated barrel to change the solid phase material to a fluent phase. Such structure exposes the maximum amount of area to the working of the barrel and the screw and conveys the molten material faster. This action is superior because the end product is at a lower temperature since the unit working time is efficient and less. This is important to the plastic processing engineer since less stabilizer is needed in such processing. Moreover, with such equipment less stable material can be more easily processed since the material is processed at a lower temperature yet achieving full plastication and thorough mixing. In addition, with such mixing the average temperature throughout the extrudate is more consistent. As more material is changed into the fluent phase, the cross-sectional area of the secondary groove 42 increases to accommodate the change in phase. With the width $w_1$ remaining constant while the cross-sectional area of the secondary groove 42 increases, maximum efficiency is utilized in converting the solid phase material to the fluent phase and maintaining them separated. Such melting of the solid phase is accomplished along the surface of the barrel between the barrel wall and the solid bed of material being worked. The heating of the material is further enhanced by the relative movement of the barrel with respect to the screw, wherein the material under a shearing action is worked and forms a film which causes a fluent flow of the material into the secondary groove 42. Thus, with the maintaining of a wide solid bed of material that is exposed to the melting action it provides for an effective means of plasticizing solid polymeric material while minimizing degradation. Such plasticated material is fed by the transition section of the feed screw into the metering section having the dual flights 26 and 28 which passes such material through the die 18. In lieu of dual flights the metering section may have but a single helical flight.

Figure 4:
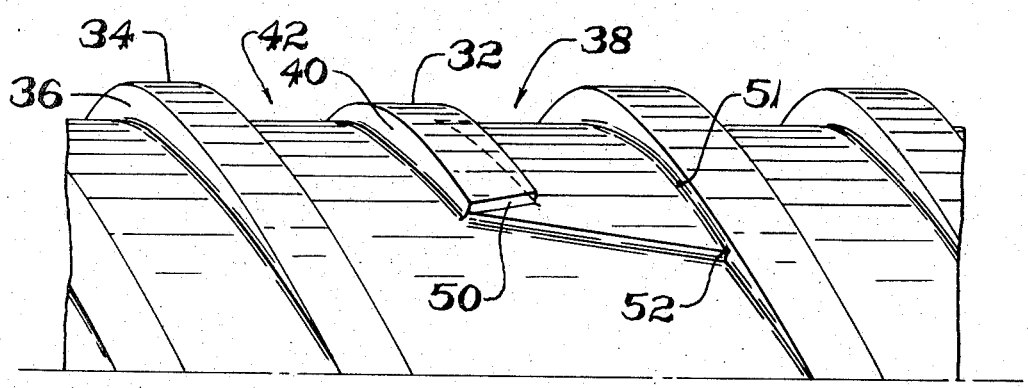
FIG. 4 is a modified form of feed screw as shown in FIG. 3 wherein the primary groove merges with the secondary groove.

A modification of the feed screw is shown in FIG. 4 wherein the primary channel 38 merges directly into the secondary channel 42 with primary flight 32 ending abruptly at 50 with its cross-sectional width $w_1$ being consistent to any width $w_1$ taken along the transition section; however, the depth of the primary channel 38 at this point is such as to expose the solid material to the plasticizing action of the barrel to change the solid phase to the fluent phase completely. Channel 38 has a constant depth portion at the very end from point 51 to point 52 to insure complete plasticization of the solid remaining at the end of the channel. The points 51 and 52 on the primary channel 38 (FIG. 4) are slightly less than the radial dimension from the rotational axis of the feed screw to the upper surface of flight 32. The constant depth of channel 38 may extend downstream from point 52 a short distance to assure full plasticization of the solid material. The operation of this modification is similar in all respects to the above-described embodiment.

Various modifications are contemplated and may obviously be resorted to by those skilled in the art without departing from the described invention, as hereafter defined by the appended claims.

I claim:

1. In a machine for processing polymeric material comprising a cylinder; said cylinder having die means at one end thereof; a feed screw rotatably mounted in said cylinder and extending longitudinally therethrough for moving plastic material therethrough to progressively change said plastic material from the solid phase to a fluent phase for extrusion therefrom; said feed screw having first means for operatively exerting continuous pressure on said plastic material for moving said plastic material; second means integral with said feed screw for continuously leading off the fluent phase progressively from said first means as the plastic material is changed from the solid phase by contact with said cylinder, said fluent phase being directed away from and not through the remaining solid phase; and said first means defines a groove having a constant axial width with decreasing radial depth in the direction of said die means providing a constant amount of surface area exposed to said cylinder for material carried by said groove.

2. In a machine for processing polymeric material as set forth in claim 1 wherein said second means has a groove which progressively increases in cross-sectional dimension toward said die means.

3. In a machine for processing polymeric material comprising a cylinder; said cylinder having a die means at one end thereof; a feed screw rotatably mounted in said cylinder for moving plastic material therethrough to progressively change said plastic material from the solid phase to a fluent phase for extrusion therefrom; said feed screw having first means for operatively exerting continuous pressure on said moving plastic material; second means integral with said feed screw for continuously leading off the fluent phase progressively changed from the solid phase by contact with said cylinder, said fluent phase being directed away from and not through the remaining solid phase; said first means defines a groove having a constant axial width to maintain a constant amount of the solid phase of the moving plastic material to contact said cylinder; said second means has a groove which progressively increases in cross-sectional dimension toward said die means; said groove of said first means is defined by the leading face of primary flight and the trailing face of a secondary flight; and said primary flight having a greater clearance between the uppermost edge portion of said primary flight and said barrel than the uppermost edge portion of said secondary flight.

4. In a machine for processing polymeric material as set forth in claim 3 wherein the bottom surface of said groove of said first means merges with said uppermost edge portion of said primary flight to provide a clearance space that is equal to said clearance space provided between said uppermost edge portion of said primary flight and said barrel.

5. In a machine for processing polymeric material as set forth in claim 3 wherein the bottom surface of said groove of said first means defines a terminal portion that provides a clearance space closely adjacent to the merging of said first means with said second means at the terminal upstream end thereof that is approximately equal to the clearance space between said uppermost edge portion of said primary flight and said barrel.

6. In a machine for processing polymeric material as set forth in claim 5 wherein clearance space defined by said terminal portion of said first means in cooperation with the interior wall of said barrel is constant for a portion of said groove of said first means.

* * * * *